Figure 1:
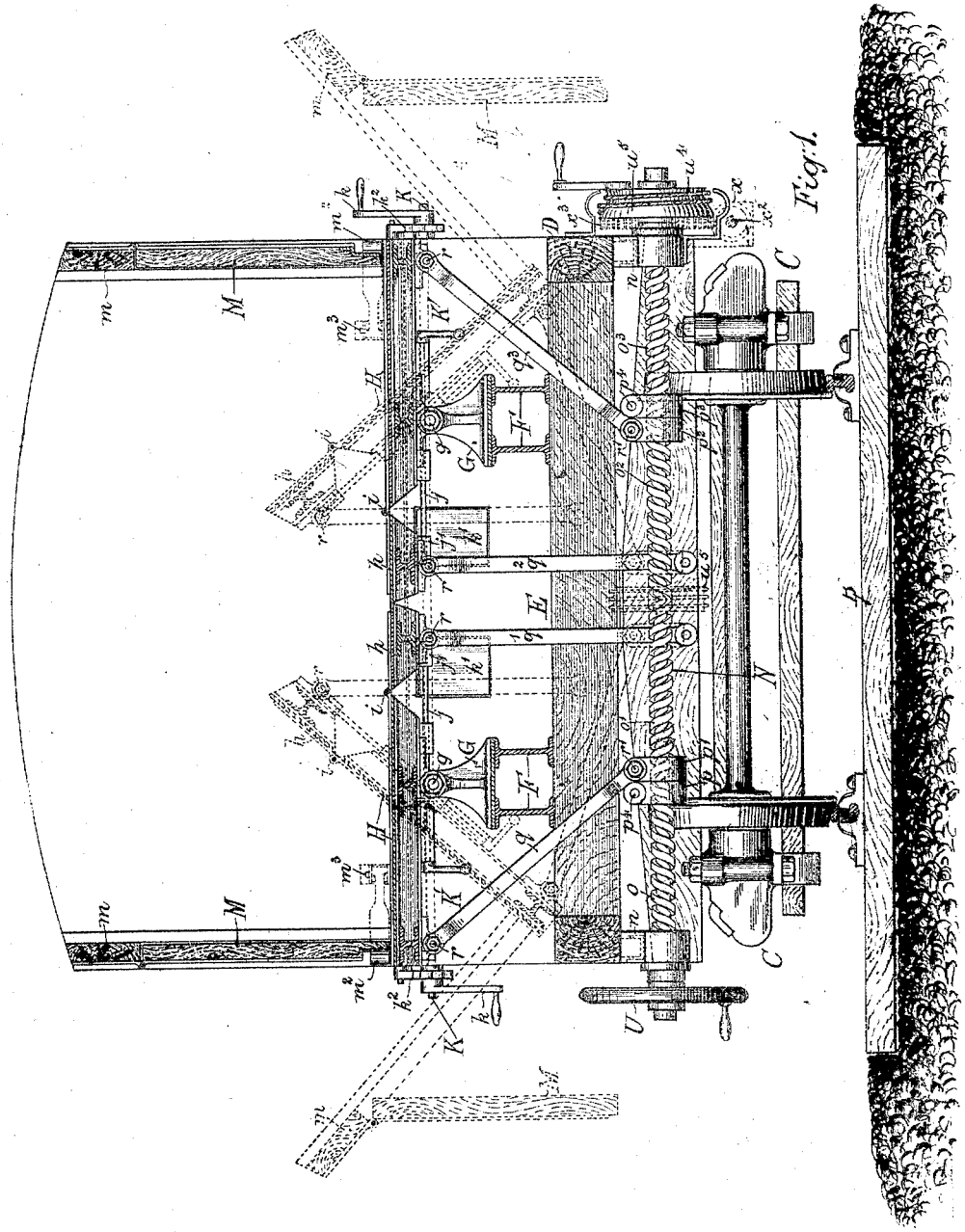

(No Model.) 14 Sheets—Sheet 1.
G. ANDERSON.
TIP WAGON.

No. 483,200. Patented Sept. 27, 1892.

Witnesses
W. H. Moss.
Robt. A. Blake

Inventor:
George Anderson,
by Henry H. Leigh
Attorney.

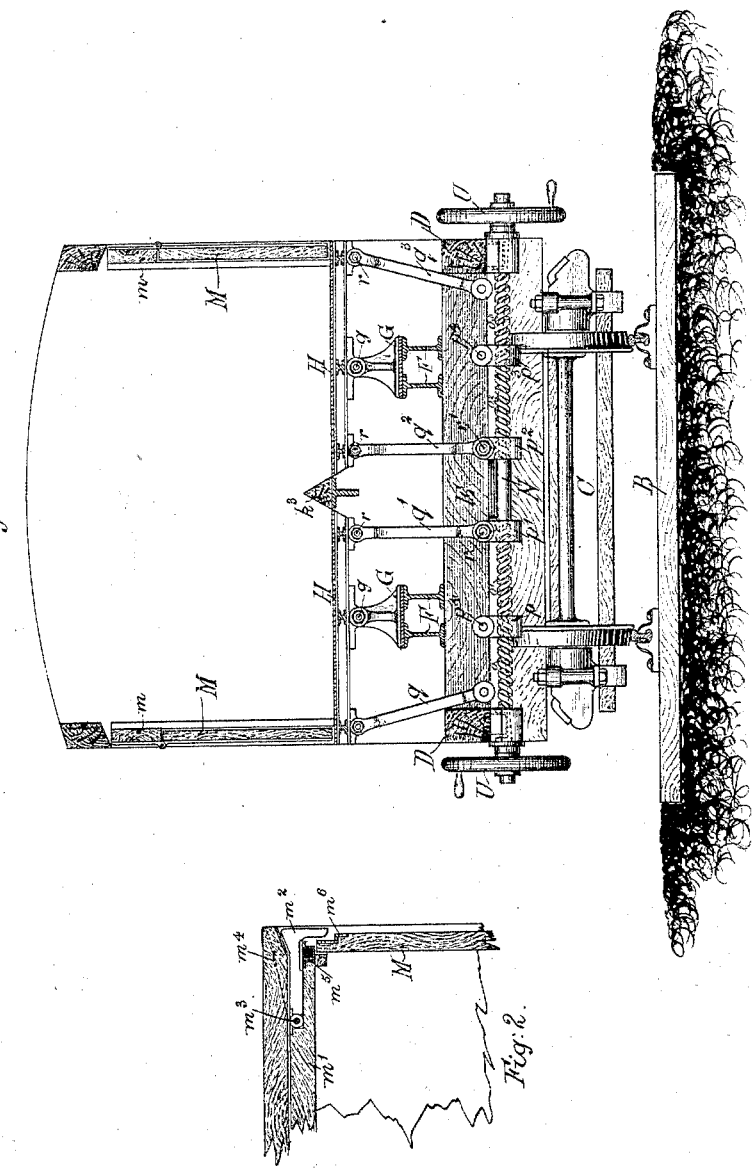

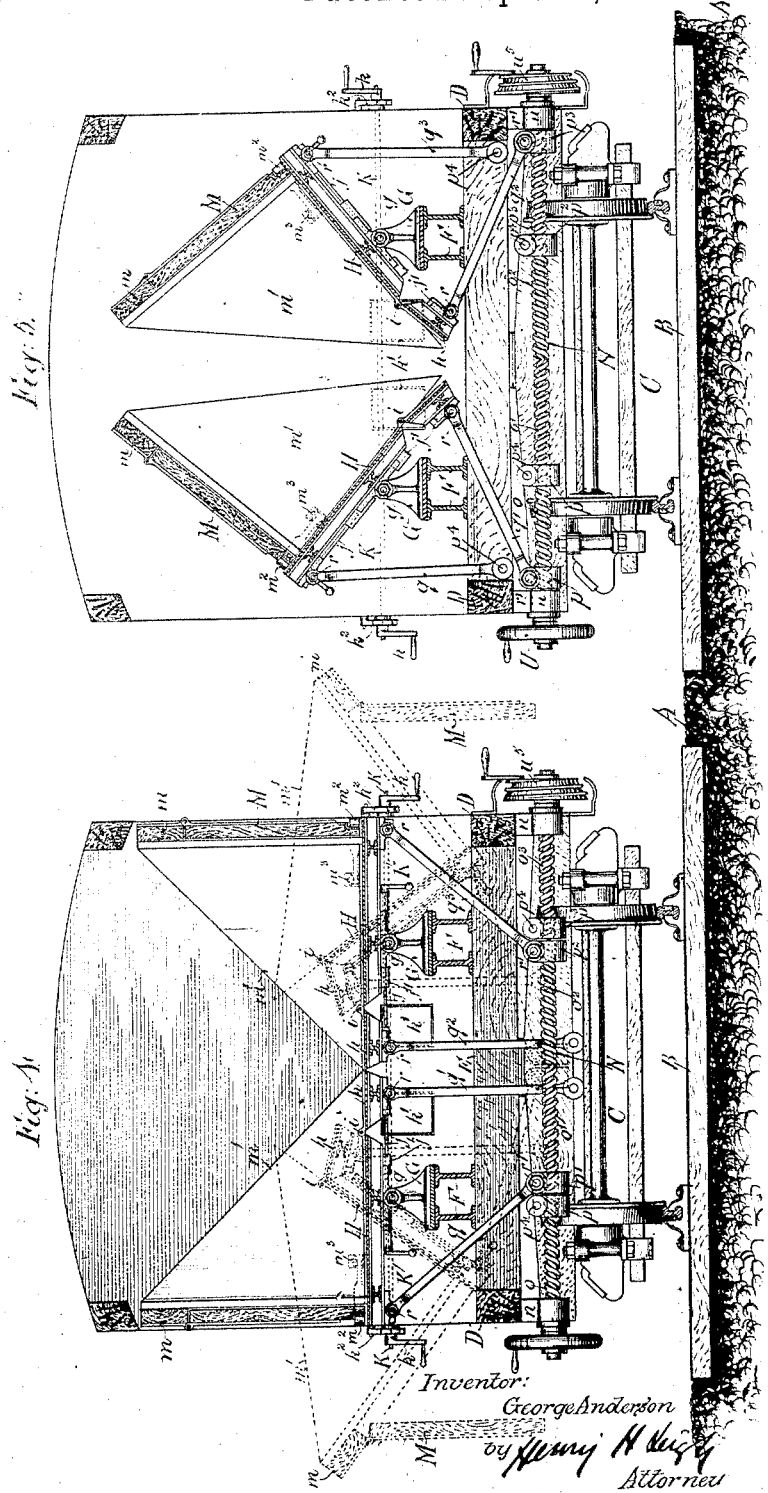

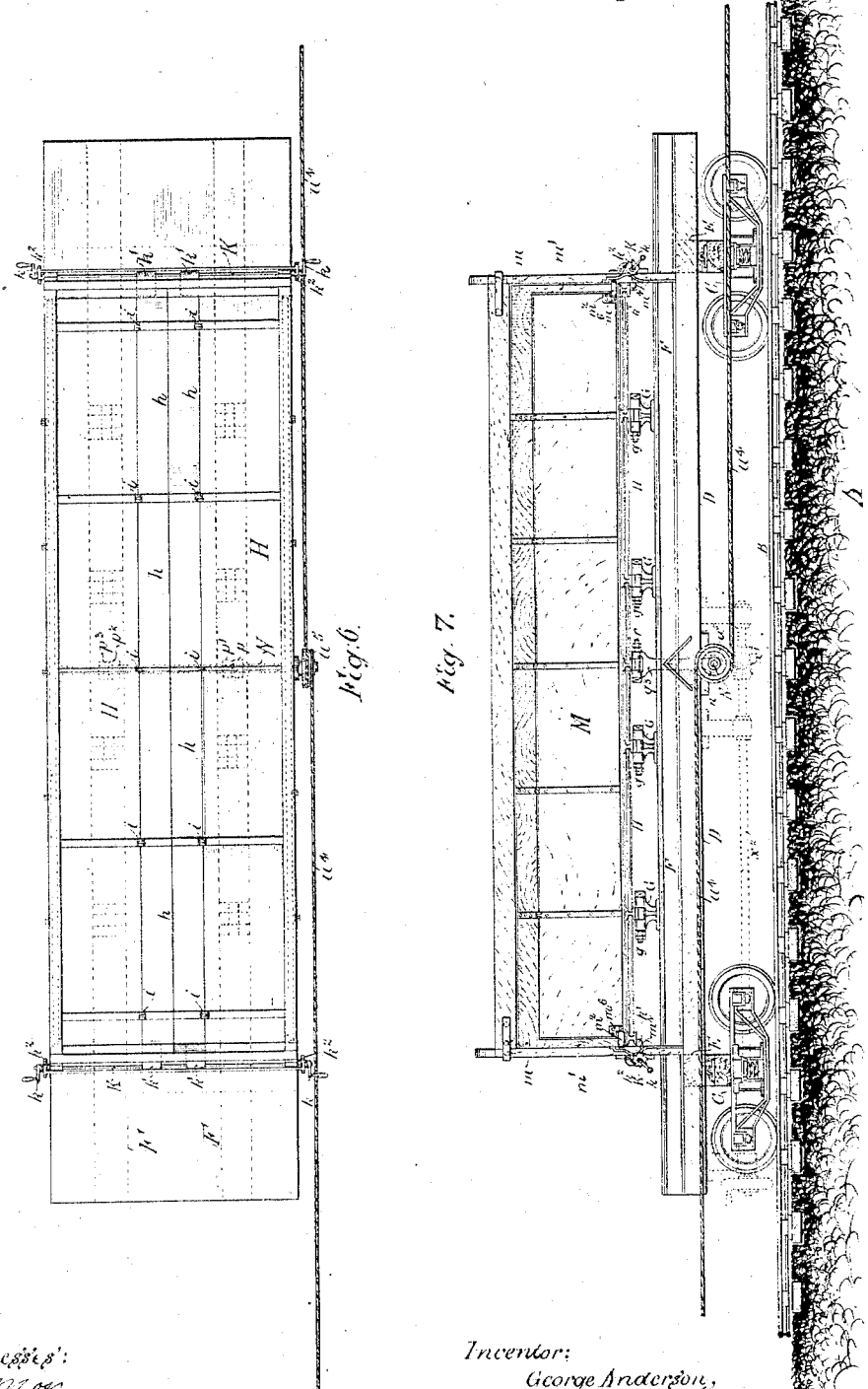

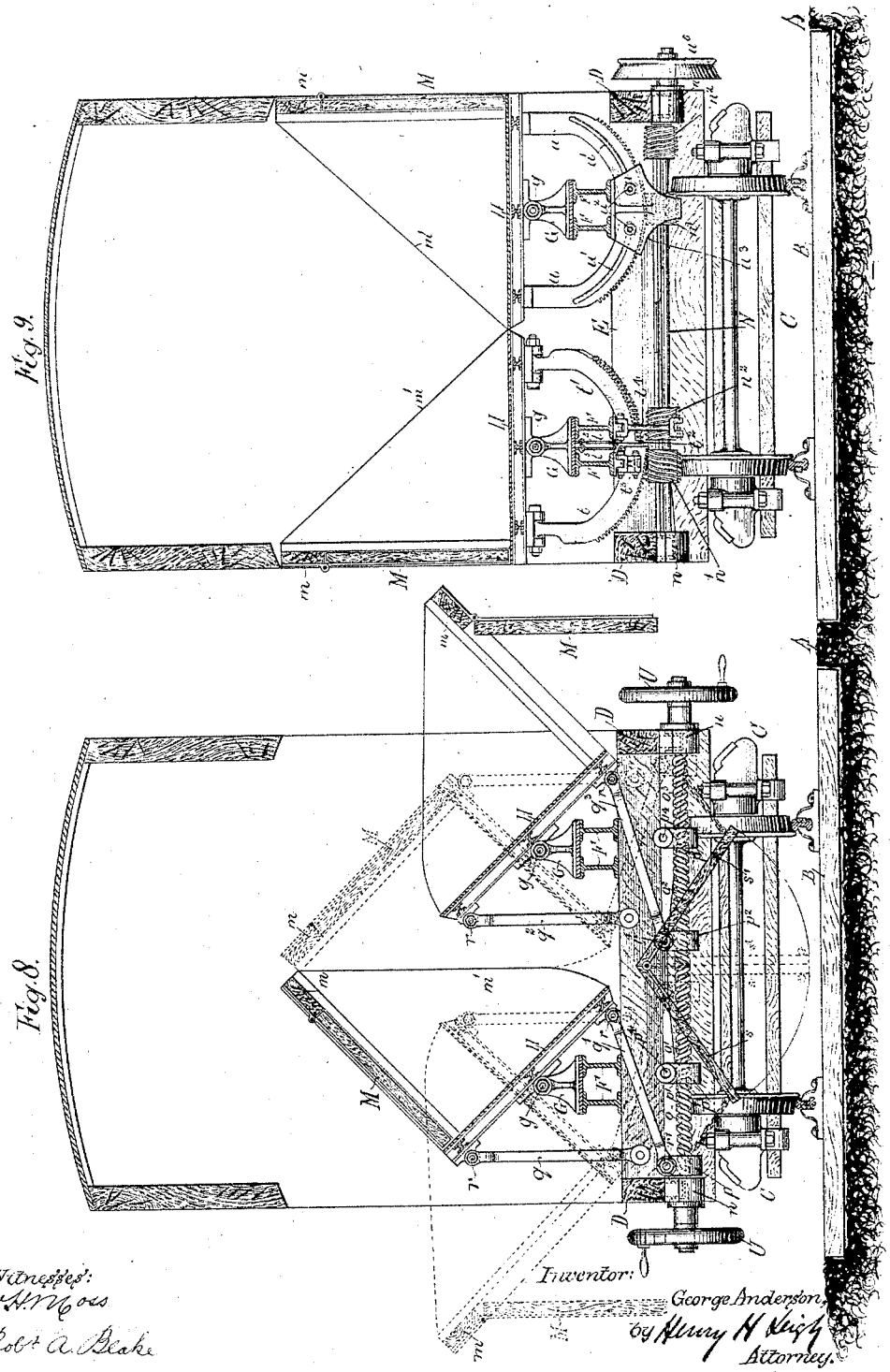

(No Model.) 14 Sheets—Sheet 6.

G. ANDERSON.
TIP WAGON.

No. 483,200. Patented Sept. 27, 1892.

Witnesses:
W. H. Moss
Robt. A. Blake

Inventor:
George Anderson,
by Henry H. Knight
Attorney

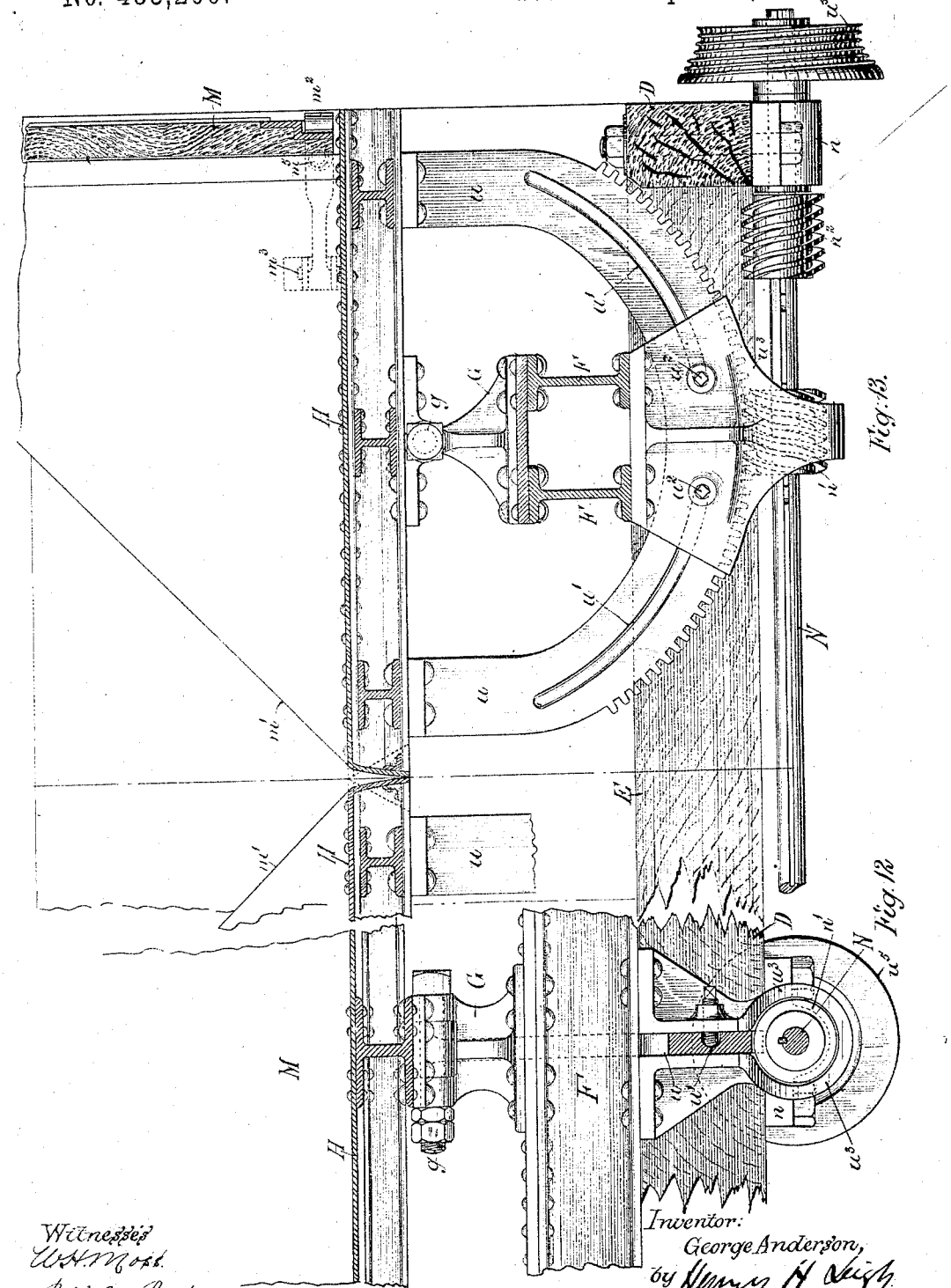

(No Model.) 14 Sheets—Sheet 8.
G. ANDERSON.
TIP WAGON.
No. 483,200. Patented Sept. 27, 1892.
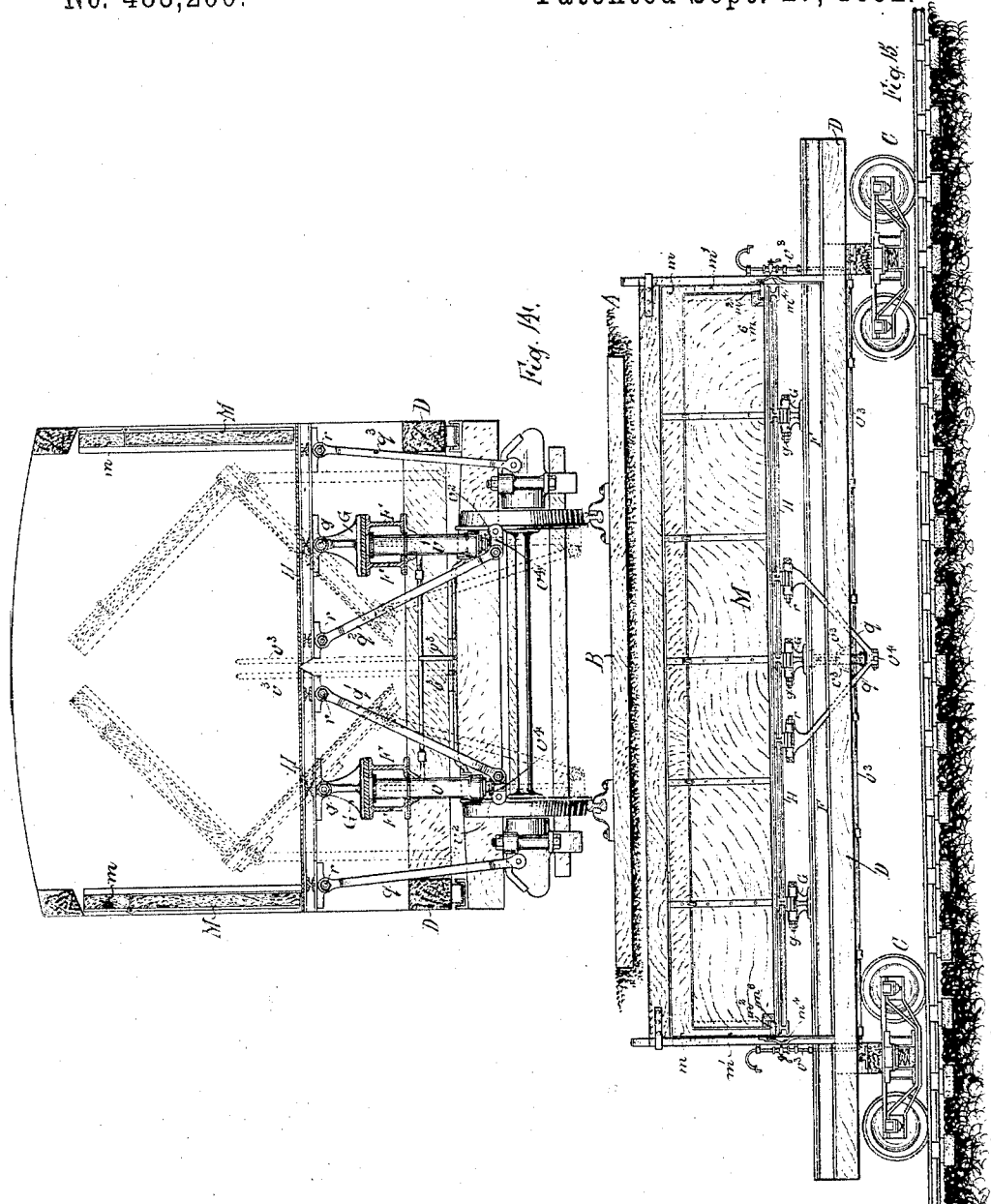
Witnesses:
W. H. Moss
Robt. A. Blake
Inventor:
George Anderson,
by Henry H. Leigh
Attorney.

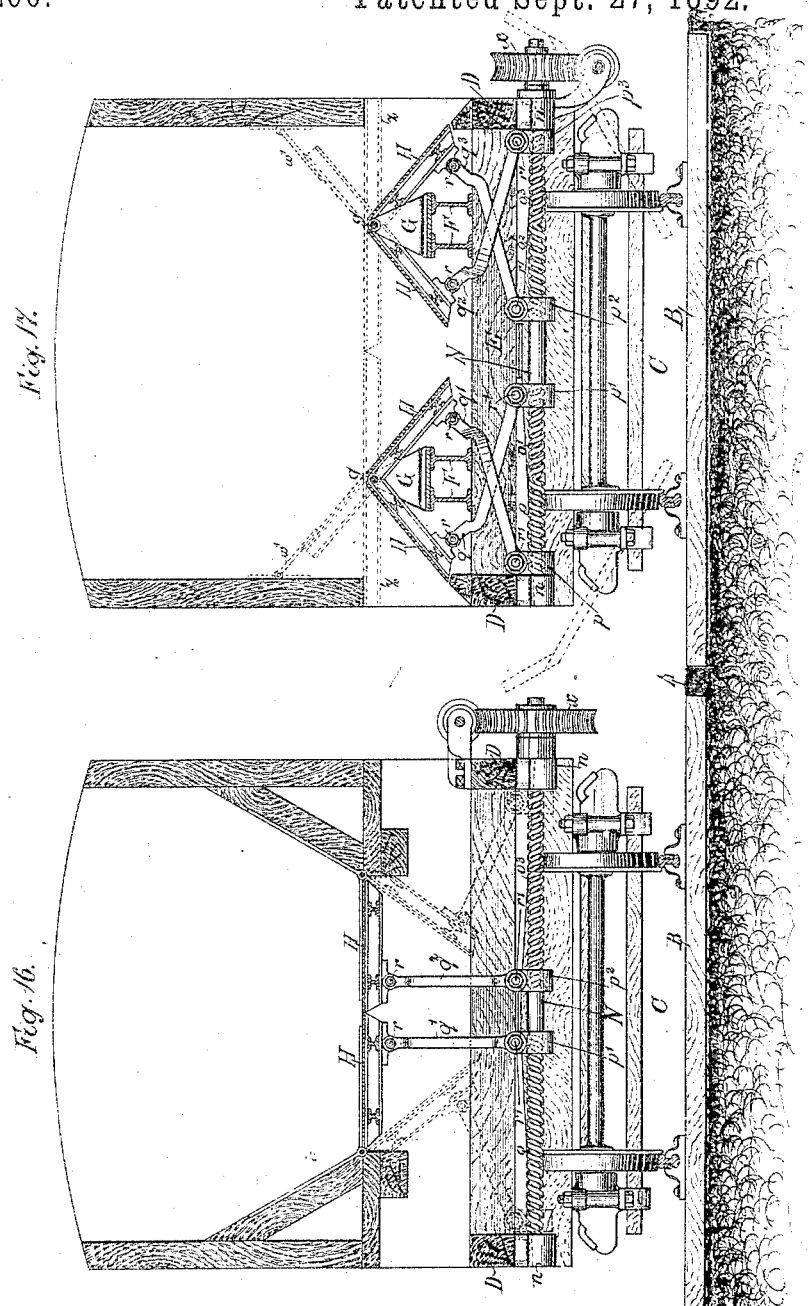

G. ANDERSON.
TIP WAGON.
No. 483,200. Patented Sept. 27, 1892.
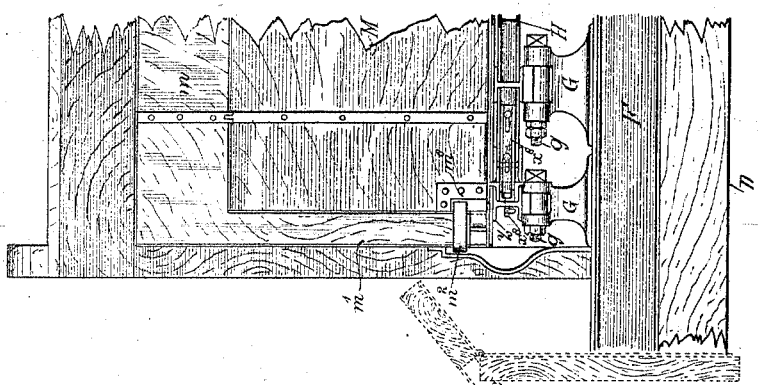
Fig. 17.ᵇ
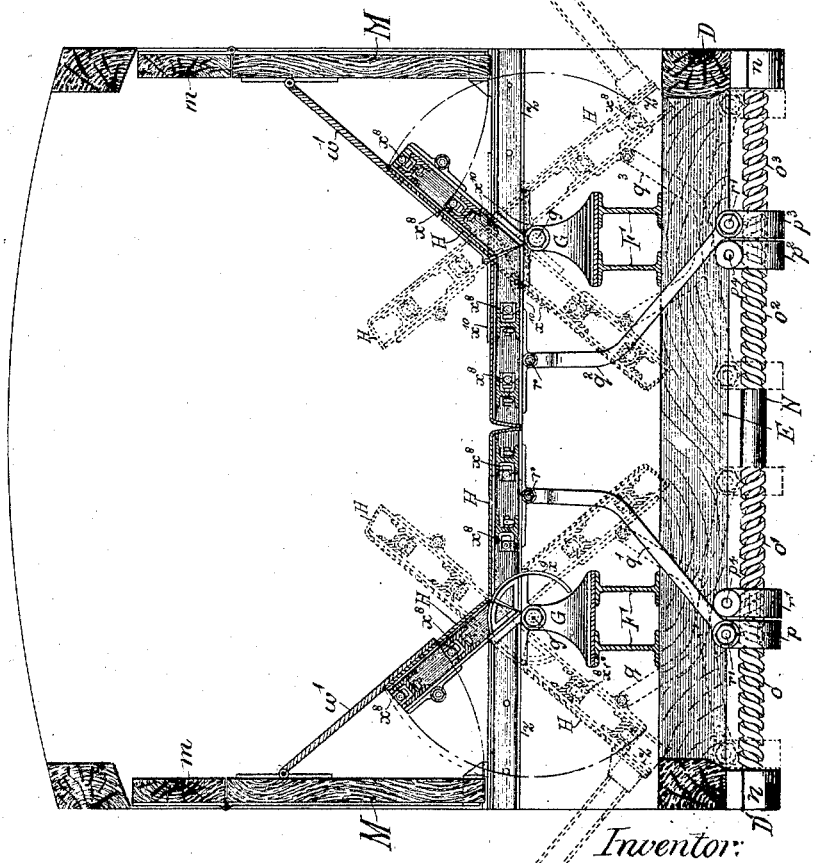
Fig. 17.ᵃ
Witnesses:
W. H. Moss.
Robt. A. Blake.
Inventor:
George Anderson,
by Henry H. Leigh
Attorney.

(No Model.)  14 Sheets—Sheet 11.

G. ANDERSON.
TIP WAGON.

No. 483,200. Patented Sept. 27, 1892.

Witnesses.
W. H. Moss.
Robt. A. Blake.

Inventor:
George Anderson,
by Henry H. Bligh
Attorney.

(No Model.) 14 Sheets—Sheet 13.
G. ANDERSON.
TIP WAGON.

No. 483,200. Patented Sept. 27, 1892.

Witnesses:
W. H. Moss
Rob't A. Blake

Inventor:
George Anderson,
by Henry H. Leigh
Attorney.

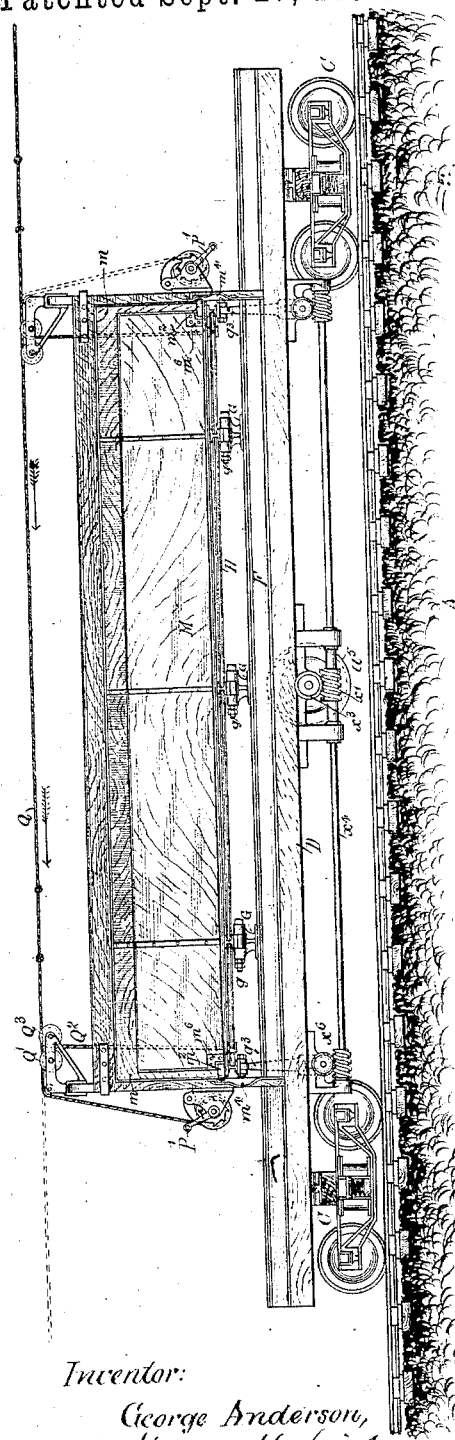

UNITED STATES PATENT OFFICE.

GEORGE ANDERSON, OF MADRAS, INDIA.

TIP-WAGON.

SPECIFICATION forming part of Letters Patent No. 483,200, dated September 27, 1892.

Application filed April 13, 1891. Serial No. 389,121. (No model.) Patented in England November 20, 1890, No. 18,822.

*To all whom it may concern:*

Be it known that I, GEORGE ANDERSON, a member of the Institute Civil Engineers, of Madras, in the Empire of India, a subject of the Queen of Great Britain, and at present residing at London, England, have invented Improvements in Tip-Wagons, (for which I have obtained Letters Patent in Great Britain, No. 18,822, dated November 20, 1890,) of which the following is a specification.

My invention relates to improvements in the construction of and means for operating tip-wagons, and is particularly applicable to tip-wagons adapted for use in the construction of the road-bed of any road or railway, as well as to wagons for coal, ore, and other similar loose material which requires to be carried or handled in the way of transit or delivery under any conditions.

Tip-wagons as hitherto used in the construction and ballasting of common and rail roads have been generally made so as to tip only to one or both sides or along the center line of the road-bed. This method of tipping has consequently entailed a considerable outlay both in time and money for the subsequent distribution of perhaps the major portion of the ballast by manual labor over the particular parts of the road-bed where it was wanted. Now, and in consequence of the present invention, it is placed within the power of the foreman of the job to tip the ballast to either or both sides or down the center line or in any one or more of the said three directions, as the condition of the work at any given point or time may demand, by changing the levels of the wagon-bottom, which for that purpose is made in two principal leaves, with which may be combined a corresponding number of subsidiary leaves. Moreover, whereas it has been the practice to tip each wagon individually and by hand, my invention provides for all the wagons to be tipped simultaneously by gearing driven from the locomotive or some special motor, whether the wagons are on the straight or on a curve, and in consequence of a prior adjustment of the tipping mechanism of each wagon each in the desired direction or directions. Further, any or all of the tipping mechanisms described or illustrated in this specification may be applied to a wagon adapted to be tipped bodily.

In order that my invention and the means by which it is to be carried into practical effect may be thoroughly understood, I will now describe it and them in detail, referring in so doing to the accompanying figures, which are to be taken as part of this specification and read therewith.

Like parts are marked throughout the figures with the same reference-letter.

Figures 10, 11:
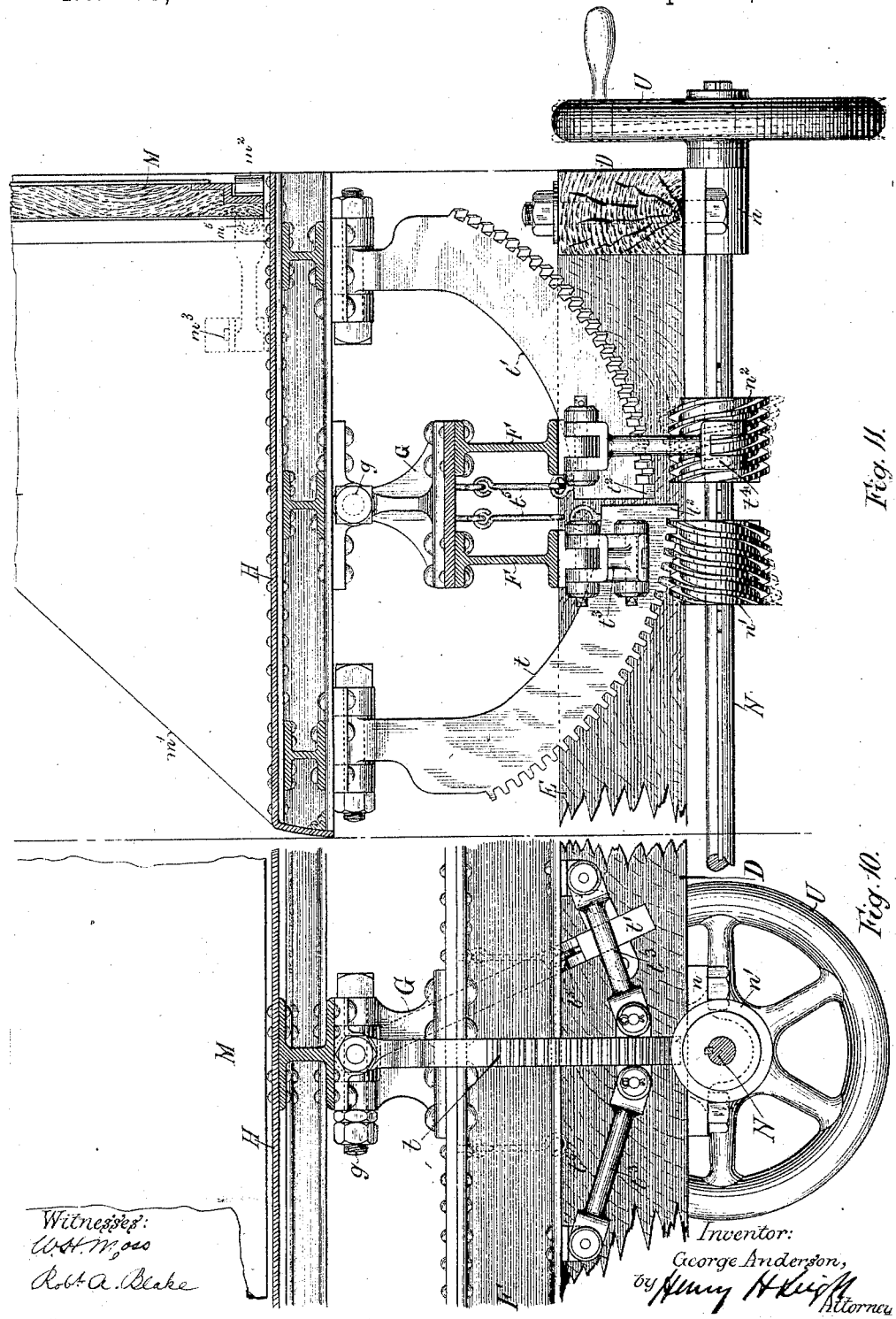
Figure 18:
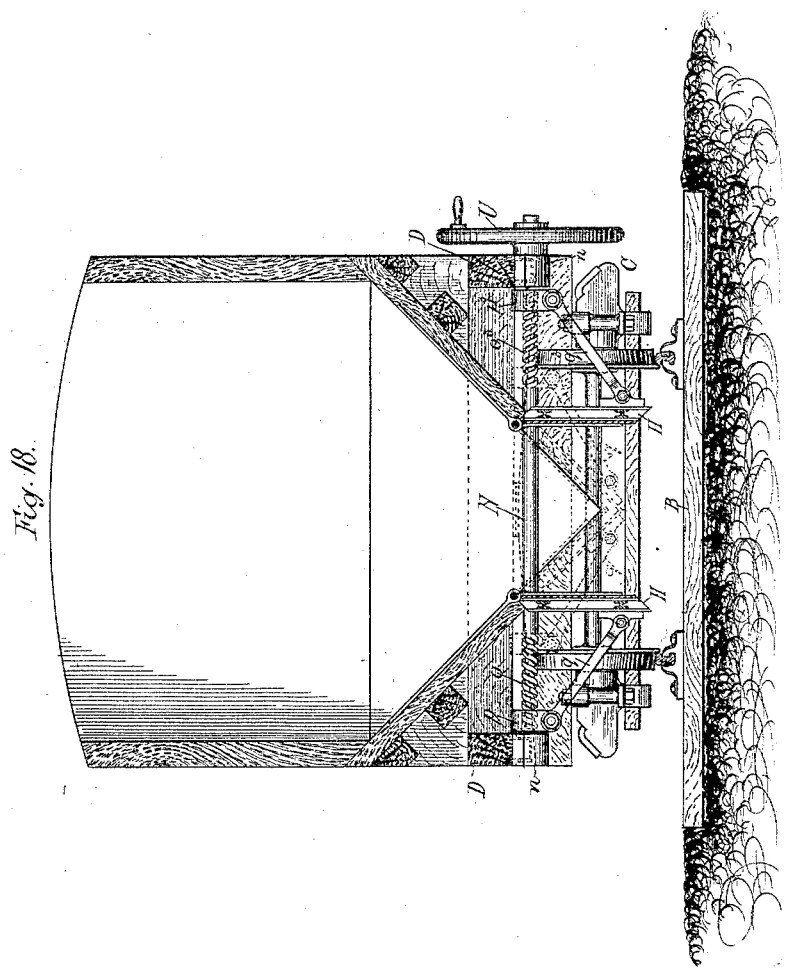
Figure 19:
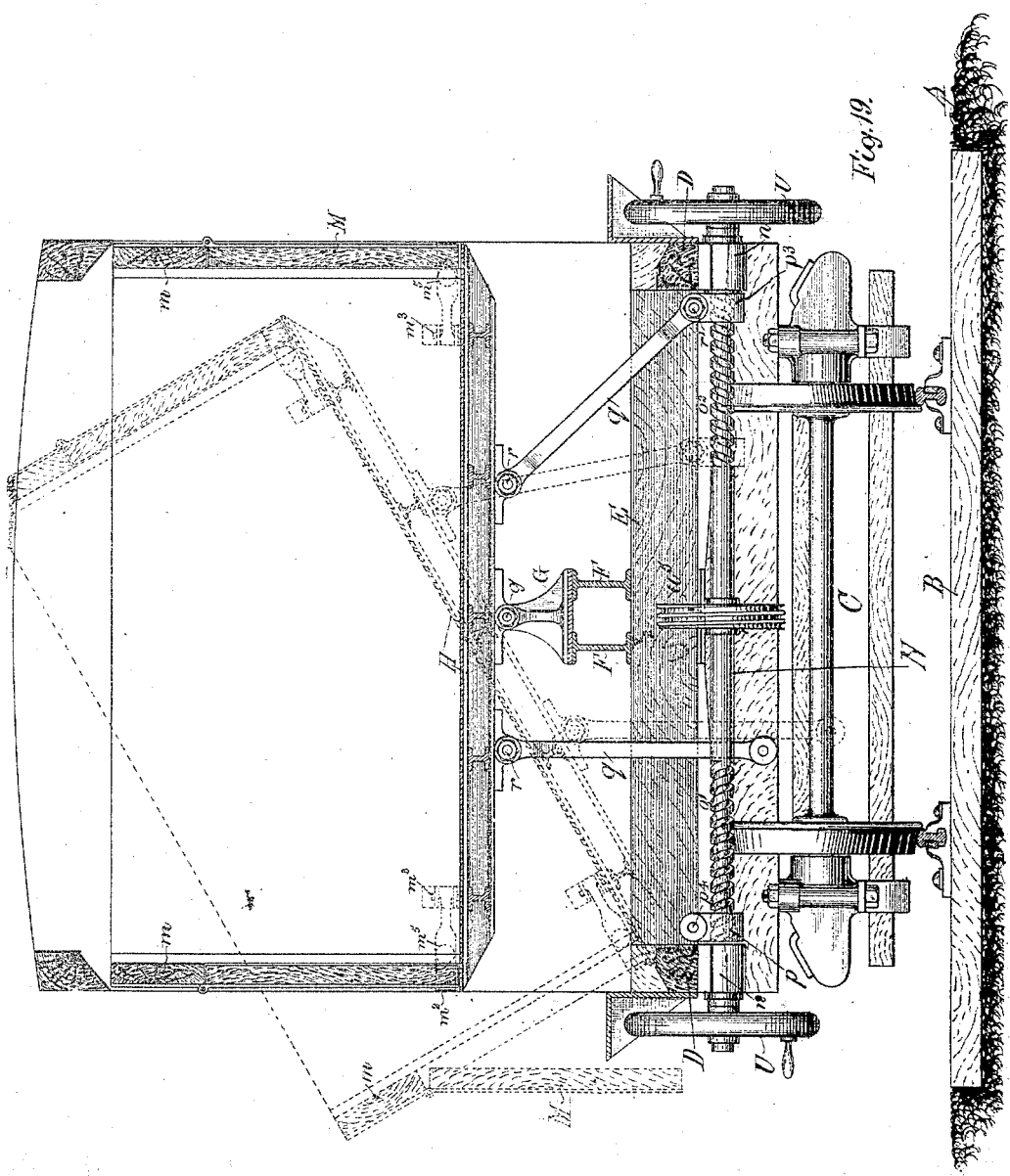
Figure 20:
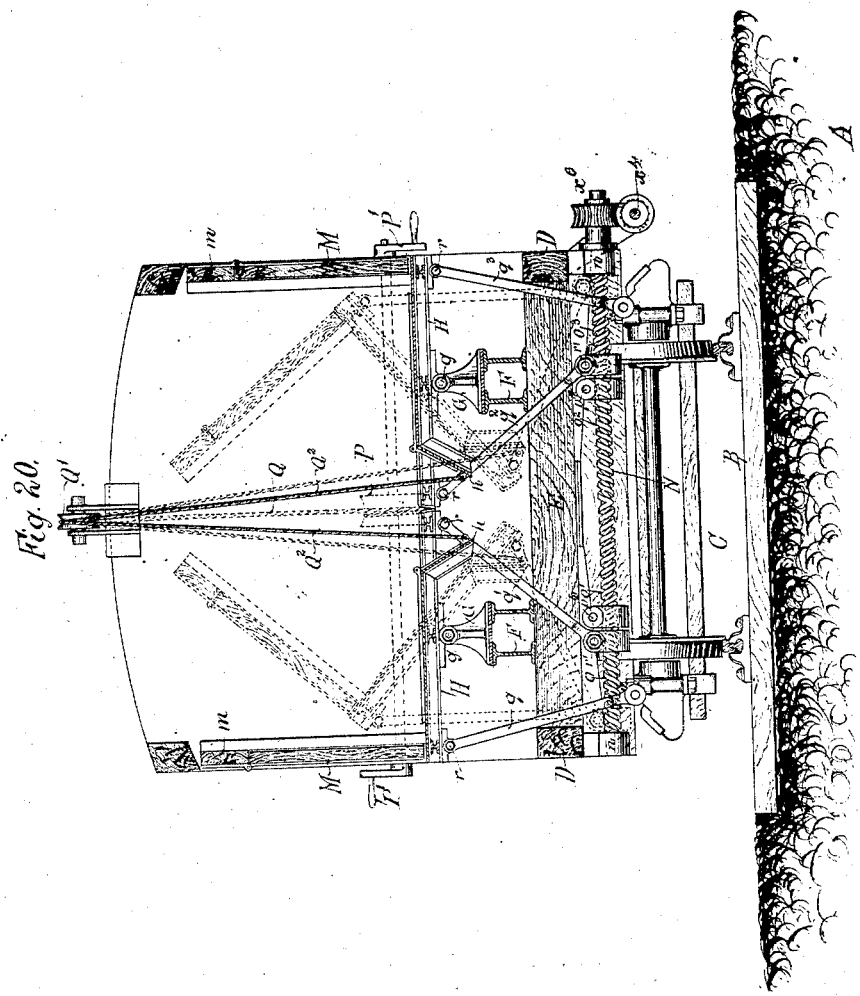

Figure 1 is a transverse sectional elevation of a three-direction four-leaf tip-wagon, shown closed and set to tip along the center and both sides simultaneously. The subsidiary leaves are shown as held in the same planes as their respective principals. Fig. 2 is a detail of the automatic wagon-side catch. Fig. 3 is a transverse sectional elevation of a three-direction two-leaf tip-wagon, shown as closed and set to tip along the center only. Fig. 4 is a transverse sectional elevation of a three-direction four-leaf tip-wagon, shown as closed and set to tip along the center and both sides simultaneously. Fig. 5 is a transverse sectional elevation of a three-direction four-leaf tip-wagon, shown as set to and tipping along the center only. Fig. 6 is a plan of a four-leaf tip-wagon. Fig. 7 is a side elevation corresponding with Fig. 6, but having a longitudinal tipping-mechanism-actuating shaft dotted in. Fig. 8 is a transverse elevation of a three-direction two-leaf tip-wagon, shown by the full lines as set and tipping to the right and by the dotted lines as set to and tipping along the left side. Fig. 9 is a composite transverse elevation of a three-direction two-leaf tip-wagon closed. Fig. 10 is a detail side elevation. Fig. 11 is a detail transverse elevation partly in section. Fig. 12 is a detail side elevation. Fig. 13 is a detail transverse elevation. Fig. 14 is a transverse sectional elevation of a three-direction two-leaf tip-wagon, shown by the full lines as closed and set to tip along the bottom and by the dotted lines as so tipping. Fig. 15 is a side elevation corresponding with Fig. 14. Fig. 16 is a transverse sectional elevation of a hopper-side flat-bottom single-direction two-leaf wagon, shown by the full lines as closed and set to tip along the center and by the dotted lines as so tipping. Fig. 17 is a transverse sectional elevation of a hopper-bottom three-direction four-leaf wagon. Fig. 17ª is a transverse sectional elevation of a modification of the leaf-action and tipping apparatus illustrated in Fig. 17. Fig. 17ᵇ is a part side elevation corresponding with Fig. 17ª and further illustrates the construction of the modification to which the said Fig. 17ª refers. Fig. 18 is a transverse sectional elevation of a hopper-bottom single-direction two-leaf wagon, shown by the full lines as set to and tipping along the center only. The dotted lines show the bottom closed. Fig. 19 is a transverse elevation, partly in section, illustrating the application of my invention to a wagon to be tipped bodily—i. e., through either side only. Fig. 20 is a transverse sectional elevation of a modification of the three-direction four-leaf tip-wagon illustrated in Fig. 1. It is shown closed and set to tip along the center. The subsidiary leaves are shown as held in the same planes as their respective principals. Fig. 21 is a side elevation corresponding therewith.

The combination of principal and subsidiary leaves of my invention is illustrated in Figs. 1, 4, 5, and 6.

Various types of the duplex right and left handed screw-nut and link tipping mechanism of my invention are illustrated in Figs. 1, 3, 4, 5, 6, 7, 8, 16, 17, 17ª, 17ᵇ, 18, 20, and 21.

Means for operating the tipping mechanism by hand are shown in Figs. 1, 3, 4, 5, 8, 10, 11, and 18.

The worm and worm-wheel gear for operating the tipping mechanism by hand is shown in Figs. 16 and 17.

The rope-and-pulley gear common to all the wagons of the train for operating their respective tipping mechanisms simultaneously is illustrated in Figs. 1, 4, 5, 6, 7, 9, 11, 12, 13, 20, and 21.

The screwed-sleeve and duplex-quadrant tipping mechanism of my invention is illustrated in Figs. 9, (left half,) 10, and 11.

The screwed-sleeve and toothed semicircle tipping mechanism of my invention is illustrated in Figs. 9, (right half,) 12, and 13.

The ram tipping mechanism of my invention is illustrated in Figs. 14 and 15.

The method of applying my invention to tipping a car bodily, as well as of adapting the links to push instead of to pull, and also a variant position for the rope-and-pulley gear, are illustrated in Fig. 19. The said variant position is also illustrated in Fig. 1.

Figs. 6, 7, 15, and 21 are drawn to the same scale—i. e., one-quarter inch to the foot. Figs. 3, 4, 5, 8, 9, 14, 16, 17, 18, and 20 are drawn to a double scale—i. e., one-half inch to the foot. Figs. 1, 2, 17ª, 17ᵇ, and 19 are drawn to a quadruple scale—i. e., one inch to the foot. Figs. 10, 11, 12, and 13 are drawn to a scale eight times that to which the first-mentioned group of figures are drawn—i. e, two inches to the foot.

The figures illustrate my invention as in use on an ordinary railroad.

A is the road-bed, B the permanent way, and C C the two bogies upon which a tip-wagon body constructed according to my invention is carried.

The under frame of a wagon consists of a pair of side beams D D and cross-beams E E. F F are two pairs of girders fast upon the cross-beams E E. G G are pairs of pillow-blocks standing thereupon, and in the tops of which are formed the bearings for the axes $g\ g$ of the leaves of the wagon-bottom.

In the hopper-bottom trucks (illustrated in Figs. 16 and 18) both girders and pillow-blocks may be dispensed with and the bearings for the axes of the leaves be fixed to the bottom edges of the hopper sides.

I. *The bottom of the wagon.*—Referring to Figs. 1, 4, 5, and 6, H H are the two principal leaves, having their axes $g\ g$ in the bearings in the tops of the pillow-blocks G G, already described. $h\ h$ are the subsidiary leaves, respectively hinged at $i\ i$ along and to the adjacent edges of the principal leaves H H. The two principal leaves, with their subsidiary leaves, form the bottom of the wagon. $j\ j$ are bolts fixed under the principal leaves, respectively. They are provided for the purpose of holding the subsidiary leaves $h\ h$ in the same planes as their respective principal leaves, as well as of releasing them when it is desired that they should be free to turn upon their hinges $i\ i$. $j'\ j'$ are the bolt-sockets fixed on the under sides of the respective subsidiary leaves. K K are transverse and horizontal rods, one at each end of the wagon, adapted to be turned in suitable bearings by means of either of two winch-handles $k\ k$. $k'\ k'$ are four raising-plates, one for each subsidiary leaf. They are fast upon the rods K K, a pair upon each, immediately under the subsidiary leaves, respectively, and are shown in Fig. 1 as hanging in their inoperative positions. They are provided for the purpose of returning the subsidiary leaves to the planes of their respective main leaves, which they will do as the wagon-bottom comes back to its closed position if they have been previously turned up through a quarter of a circle into the horizontal plane. A ratchet-and-pawl device $k^2$ is provided near each winch-handle for the purpose of holding the plates $k'\ k'$ in the said plane. If the principal leaves and the subsidiary leaves are to be tipped upward from the center line of the wagon, as in Fig. 1, the bolt is locked, if desired, maintaining the subsidiary leaf in the plane of the main leaf; but if it is desired to increase the central opening $l$ the bolt $j$ is withdrawn and the subsidiary leaf released, as in Fig. 4. The bolts $j$, transverse bars K, winch-handles $k$, raising-plates $k'$, and ratchet-and-pawl devices $k^2$ constitute proper apparatus for holding the subsidiary leaves in the same planes as their respective principals, releasing them therefrom and returning them thereto, respectively; but any suitable equivalents may be adopted.

The special objects and functions of the subsidiary leaves $h$ are (a) to prevent the two principals from jamming against each other when they are to be tipped toward the center of the road-bed and (b) to increase the tip-delivery along the center line.

(a) With reference to the prevention of the two principal leaves H jamming against each other, it will be observed that as they travel at an equal rate and their axes $g$ are in a plane beneath them they would jam against each other as soon as it should be attempted to tip them downward to the center of the road. So the subsidiary leaves $h$ are provided. They swing downward away from each other, so that the front edges of the said principals can move without impeding each other. The jamming above referred to may also be prevented by providing for one principal leaf being moved faster than the other. This differentiation in rate of motion would be accomplished by making one portion of the threads on the transverse shaft of a quicker pitch than the other. A third method characterized by the absence of the subsidiary leaves is illustrated in Fig. 3, where the principals are not too wide to move without jamming, the necessary central space being made up by the base of a preferably longitudinal beam $k^3$.

(b) With reference to increasing the tip-delivery along the center line, it must be borne in mind that when a wagon is to be tipped along the center of the road-bed, as illustrated in Fig. 5, the upper portions of the load will be compressed between the approaching wagon sides and principal leaves H and that such compression will, so far as it exists, tend to directly retard the process of tipping; but inasmuch as, according to my invention, the area of the central gap $l$ is by the drop of the subsidiary leaves $h$ under the action of the bars $q'$ $q^2$ it then follows that any such compression will be prevented from establishing itself.

Referring to Figs. 17, 17$^a$, and 17$^b$, $z$ $z$ are pairs of transverse beams. These are pivoted in the same plane as are the leaves H H, but clear right and left of them. The length of each beam is equivalent to the widths of two leaves. The links $g$ $g'$ $g^2$ $g^3$ (or their equivalents, the toothed quadrants or semicircles illustrated in Figs. 9 to 13 and described therewith) are connected to the said leaves in the manner and for the purpose hereinbefore specified. Holding devices $x^8$ $x^8$ of any suitable type are provided for the purpose of connecting the beams to their respective leaves for the purpose of imparting the motion of the leaves to the beams. For instance, if the outer or inner leaves are to be relatively tipped up and down into the same inclined plane then will the connections between the leaves, links, and traveling nuts be arranged and provided for on the principles and according to the method already specified and illustrated. The frames of the truck sides are carried upon the outer extremities of the beams $z$ $z$, so that the carrying capacity of the wagon will not be diminished by the swing of the wagon sides toward the center line. It is evident that when the two pairs of leaves H H are tipped up into planes converging in a line beneath the central line of the wagon some provision must be made for the prevention of the formation of longitudinal spaces between the wagon sides and the rising or raised edges of the outer leaves H H. Accordingly I provide for this prevention in the following way. A horizontal flap $w'$ is hinged or applied in any suitable way to and along the inner face of each wagon side. It is of such a width that its free edge stands in the path of the adjacent leaf when the latter is tipped upward, and therefore suffices to make up the distance from the wagon side to the adjacent edge of the said leaf and to overlap the same. It is evident that when the leaves H H are both tipped downward, as illustrated in Fig. 17, there will be produced a gap just above the line which passes through all the axes $q$, excepting only where are the operation parts of the pivots. It therefore becomes necessary to make a practical provision for the automatic closure of the said gap under all the circumstances under which it will be produced. Such provision is illustrated in Fig. 17$^a$, which shows two devices, either of which will meet the requirements of my invention. Referring to the device illustrated on the left-hand side of the figure, $x^9$ is a curved plate. The arc is struck from the center $g$, about which the leaves H H swing, and the radius of the plate is such that its periphery is always in contact with the opposite faces of the leaves H H. The plate $x^9$ is illustrated as fixed to one of the leaves H; but it may be supported in its operative position by any convenient means. The device illustrated in the right-hand half of the said figure differs from the one last described to the extent of its being a flat plate $x^{10}$, hinged to one of the leaves and lying upon the other. Either of the devices just described is capable of modification, and my invention includes any such modification, the essence of the device now under specification being that it should automatically effect the closure of the gap between the leaves H H of a pair under any circumstances. Referring to Figs. 20 and 21, the modification in respect of the bottom of the truck consists in making the subsidiary leaves $h$ shorter than their principals H at each end and returning the ends $h'$ of the principals outside the ends of the subsidiary leaves, so that they meet in the center line of the truck. The consequent modifications of the tipping mechanism are described in detail in sections III and VI.

II. *The wagon sides.*—Referring to Figs. 1, 2, 3, 4, 5, 6, 7, 8, 11, 13, 14, 15, 19, 20, and 21, the wagon sides M M are suspended from top rails $m$ by suitable hinges. There may be posts or triangular end pieces $m'$. $m^2$ is an automatic spring-catch pivoted at $m^3$ to the end post. $m^4$ is a cavity in wagon end, into which cavity the spring $m^2$ is pushed by the spring $m^5$ as the wagon side is tipped outward, with the result that the side is disengaged from the catches $m^2$. As the sides are returned to the vertical they pass behind the noses of the spring-catches, which are then locked in front of them by engagement by the wagon ends at $m^6$.

III. *Screw-nut and link tipping mechanism.*—Referring to Figs. 1, 3 to 8, and 16, 17, and 18, N is the transverse shaft, having its bearings in brackets $n$, depending from the side beams D D. The figures now under description show a wagon as provided with only one transverse shaft; but I wish it to be distinctly understood that my invention does not confine me in respect to the number of these shafts, inasmuch as more than one may be used if such use be for any reason desirable. Figs. 20 and 21 illustrate the use of two shafts, one at each end of the truck. No matter how many shafts may be used, they are all in respect of their operative parts and adjuncts counterparts of each other. $o\ o'\ o^2\ o^3$ are four screw-threads upon the (or each) shaft. They are of equal length and (subject to what has been specified above as to the differentiation in respect of pitch) they are of equal pitch. In respect to their relative positions on the shaft any one screw is of the opposite hand to either of the adjoining ones. This alternation in respect of the hands of the screws is one of the features of my invention, and attention is drawn to it accordingly. $p\ p'\ p^2\ p^3$ are four traveling nuts appropriated, respectively, to the four screws $o\ o'\ o^2\ o^3$. $q\ q'\ q^2\ q^3$ are four links. The function of these links is to provide an operative connection between the leaves on the one hand and the traveling nuts on the other. The links are therefore pivotally connected to the under sides of the leaves and to the nuts, respectively, by means of any suitable coupling devices. The drawings show the use of a type of devices consisting of eyes and bolts $r$; but other suitable and equivalent devices may be utilized. Whether there are subsidiary leaves or not, there are always as many coupling devices as nuts. In respect of the position of the depending eyes appropriated to each pair of leaves it is to be noted that they are fixed thereto as far outward from the axis thereof and on respectively opposite sides of it as is practicable. The links $q$ to $q^2$ are shown as permanently connected to their respective coupling devices $r$, and the nuts $p$ to $p^3$ are provided with suitable eyes $p^4$, by means of which, together with corresponding eyes on the relative ends of the links and the pins $r'$, the links may be connected with either the outer or inner nut, as the tipping job may require. The modification of the tipping mechanism illustrated in the last two mentioned figures consists in fixing all the coupling devices $r$ on the principal leaves instead of fixing half on the principal and half on the subsidiary leaves. The devices $r$ hereinbefore described as fixed to the under side of the subsidiary leaves are fixed to the under side of the returned ends $h'$ of the principals, and a special rope-and-pulley gear is provided for actuating the said subsidiary leaves. P is a transverse winding-drum supported in suitable bearings at the front end of the leading truck. It is rotated by any suitable mechanism or agency. The figures show the application of a winch-handle P' at each end. Ratchet-wheels and pawls are provided to prevent the drum being revolved backward by the weight on or of the leaves $h$. The rope Q is led over pulleys Q', fixed on the tops of the trucks at each end, and branch ropes Q², passing over other pulleys Q³, connect the leaves $h$ thereto. When the rope Q is wound in, the branch ropes Q² are let out downward, thereby freeing the leaves $h$. I prefer to fit both ends of a truck with a winding-gear. The rope Q extends for the full length of the train. The connections of the branch ropes Q² to the rope Q are preferably detachable, so that as the latter is moving in one direction—say to the left—the branch ropes Q² by being disconnected from the main rope Q and reconnected thereto on left hand of the main-rope pulley Q' will, after the leaves $h$ have been dropped, raise them again and effect their closure. The shaft-actuating mechanism (illustrated in Figs. 20 and 21) is described under section VI. I think it preferable that the links should be permanently connected to the coupling devices on the leaves instead of to the nuts, for then those not in use will hang from the leaves without getting in the way of the other members of the tipping mechanism, whereas if the permanent connection be to the nut there would be required some special device for holding those links which would be for the time being out of use and of keeping them clear of the other members.

With a wagon constructed according to my present invention it is possible to tip in either of three directions, and hereinafter follow detailed directions, referring to some of the accompanying figures, as to the differentiated tippings: (*a*) to both sides and along the center of the road-bed, (*b*) along the center of the road-bed, and (*c*) to either side only.

(*a*) *When the ballast is to be tipped to both sides and along the center of the road-bed.* (See Fig. 1.)—The outer coupling devices $r$ are respectively linked by the links $q\ q^3$ to the inner nuts $p'\ p^2$, the said links then crossing the pivoted lines of the respective principal leaves H H, and motion is then given to the transverse shaft N, according to the operative directions of the respective pitches of the threads $o$, $o'$, $o^2$, and $o^3$ thereon. The inner threads $o'\ o^2$ being differentiated—*i. e.*, one right-handed and the other left—both meeting under the central line of the wagon-bottom to the central line of the tipping-space $l$, and their traveling nuts $p'$ $p^2$ being then at the outer ends of the threads, it follows that the said respective nuts $p'$ $p^2$ will be drawn together and the leaves II II tipped toward the wagon side. At the same time that the leaves are being tipped sidewise and outward their inner edges will be moved away from each other and a central gap or tipping-slot of a constantly-increasing width be formed over the center line of the road-bed, the subsidiary leaves being controlled in respect of their tipping function by the control exerted upon them by the bolts $j$.

(b) *When the ballast is to be tipped along the center of the road-bed.* (See Fig. 5.)—The inner coupling devices $r$ $r$—i. e., those nearest to the center line of the wagon—are respectively connected to the outer nuts $p$ $p^3$, which latter are then close up to the respective junctions of the outer threads $o$ $o^3$ with the inner threads $o'$ $o^2$, and motion is then given to the shaft N. Both leaves will then be tipped toward the center, forming a tipping slot or mouth of a width increasing in respect of its width, according to when the subsidiary leaves $h$ $h$ are releasing.

(c.) *When the ballast is to be tipped to either side of the wagon at a time.* (See Fig. 8.)— The inner coupling device $r$ of one leaf II and the outer one $r$ of the other leaf II are connected by the respectively inner and outer links $q'$ $q^3$ to one outer and one inner nut $p$ $p^2$, respectively. When the shaft N is rotated, both leaves will be tipped to the same hand or side parallelly with each other, one tipping onto the side of the road-bed direct and the other onto the center of the bed, and to give the desired direction to the ballast being discharged through the opening formed between the two leaves I have a diaphragm $s'$ pivoted under the wagon and adjustable at a proper slope. The diaphragm $s'$ will conduct the ballast from the left leaf II toward the right-hand side of the road-bed.

I do not confine myself to the exact disposition and use of the links described, as the same may be varied. For instance, to tip the load to both sides and down the middle of the road-bed the outer coupling devices may be linked to the outer nuts, and the latter being at the outer ends of their respective screws, and under any arrangement, the links may be made to push at the leaves instead of to pull at them, in which case the hands of the threads and the points of connection would be reversed.

IV. *Toothed-quadrant tipping mechanism.*—Referring to Figs. 9, (left hand,) 10, and 11, the transverse shaft N is fitted with two worms $n'$ $n^2$, of opposite hands, each one fast upon the shaft in the respective positions illustrated—i. e., one in gear with one quadrant $t$ and the other quadrant $t'$ out of gear with its worm. This quadrant mechanism is applicable only to a two-principal-leaf construction of car-bottom, inasmuch as it does not afford means for moving a principal and subsidiary leaf at a time. It should be borne in mind that inasmuch as the motion of the toothed edge of the quadrant is one through an arc of a circle the respective worm must be, or at any rate is preferably, made non-parallel—that is to say, from the axis of the leaf as a center. The pitch-lines of the teeth on the quadrants $t$ $t'$ and the threads on the worms $n'$ $n^2$ are therefore portions of two concentric arcs. It will be noted that each principal leaf II is provided with a pair of quadrants and two worms. I prefer to use a pair of quadrants, each one provided with a slot $t^2$, so that the maximum distance through which each quadrant can tip its leaf is only through an arc of ninety degrees. The quadrants are pivoted to the leaf II at equal distances from its axis $g$. $t^3$ $t^4$ are two pairs of holding-links, each of which is used for holding its respective quadrant in the vertical and its operative plane. Provision is made for holding the non-operative quadrant out of work by hooks $t^5$, pendent from the pillow-block and adapted for that purpose.

V. *The semicircular toothed tipping-gear.*— Referring to Figs. 9, (right half,) 12, and 13, a toothed semicircle $u$ is made use of. The worms $n'$ $n^2$ are of the same construction as described with reference to Figs. 9, (left half,) 10, and 11. I form grooves $u'$ in the sides of the semicircle, into which screws $u^2$ may be entered to act as stops for the purpose of stopping the tip of the wagon in either direction. These screws turn through plates $u^3$, provided for that purpose, and are engaged with or disengaged from their respective grooves, according to the direction in which the tipping is to be effected. The worms $n'$ $n^2$ are for the quadrant mechanism adjustable upon the shaft N, and either may be used, as may be found convenient. The constructions illustrated in Figs. 16, 17, and 18 are modifications of the respective wagon-body constructions hereinbefore described. With reference to Fig. 17, it must be pointed out that there are no subsidiary leaves and that the four links are connected to the principal leaves accordingly. The outer leaves, it will be observed, can only, by reason of their being pivoted independently of the inner leaves, discharge through the openings in the wagon sides. Therefore when all the load is tipped toward the center removable and adjustables slopes $w$ $w$ (indicated by dotted lines) are used.

VI. *The shaft-actuating mechanism.*—Each shaft N may be rotated *per se* through a hand-wheel U, fast upon the outer end of the shaft. For the purpose of providing access to the shaft-actuating mechanism from either side of the train I may fix a hand-wheel on each end of the shaft. The hand-wheel and pulley-gear may be amalgamated, as shown in some of the figures. A further modification of the shaft-actuating mechanism is illustrated in Fig. 17. This modification consists of a longitudinal shaft and worm-gear and worm-wheel $x$, the latter on the transverse shaft. This gear is particularly applicable for actuating the tipping mechanism of a multiple-transverse-screw wagon. Now, my invention goes beyond the above-mentioned *per se* actuation of the shafts to the extent of providing for all the shafts of the wagons constituting the train being worked together. For this purpose I fit a plain or grooved pulley $u^5$ upon an extension of each shaft. A rope $u^6$, worked from the engine of the train or any other suitable motor, is led around all the pulleys, so that they shall all be worked together. The pulley $u^5$ is not necessarily upon an extension of the shaft, but may be keyed upon the center of the shaft, as illustrated in Figs. 1 and 19. It may sometimes be necessary to tip a single wagon of a loaded train independently of the others. For this purpose I provide a worm $x'$ upon a shaft $x^2$, adapted to be rotated by a hand-wheel U. The worm $x'$ gears into a wheel $x^3$ on (preferably) the back of the pulley. (See Figs. 6, 16, and 17.) The modification illustrated in Figs. 20 and 21 shows the rope-pulley $u^5$ keyed upon the center of the shaft, which carries a worm-wheel $a^3$ upon its outer end. The wheel $x^3$ gears with a worm $x'$ upon a shaft $x^4$, the motion of which is imparted to the transverse screw-shafts through worm and worm-wheel gears $x^6$, or two sets of the screw-and-link or the quadrant or semicircular tipping devices described in sections III, IV, V, and VI, or the ram worked by any kind of fluid-pressure tipping-gearing described in section VII may be adopted at the ends of car, as shown in Fig. 21. Motion may be imparted to all of these devices through a vertical rod fixed at the ends of car-platforms and connected by means of spur-wheel or screw-and-worm gearing with the shafts $x^2$ or $x^4$ (shown in Figs. 7 and 21) and operated by hand or other suitable power.

VII. *Ram - apparatus tipping-gear.*—This is illustrated in Figs. 14 and 15. $v\ v'$ are the pneumatic cylinders; $v^2\ v^2$, the rams; $v^3\ v^3$, their supply-pipes, independent of each other, and $v^4\ v^4$ their cross-heads. The dotted lines show the positions of the leaves at the end of the tip. The leaves H H, it will be noticed, are not fitted with subsidiary leaves $h$; neither are they separated by a fixed bar, so that the special method already described must be adopted to prevent them jamming. One ram is put into action before its fellows; or, if they are started together, one may be made to travel faster than the other. As many pairs of rams may be used as may be necessary. With reference to Fig. 19, it is to be noted that it illustrates the application of my invention to the tipping of a car bodily by the application of a modified screw-nut and link gear. As there are no leaves in the wagon-bottom, there is only one axis, which is a central one, one pair of screws, which are at the respective outer ends of the transverse shaft, one pair of traveling nuts, and one pair of links.

I wish it to be distinctly understood that my invention does not in any respect confine me as to the number of sets of tip mechanisms of any of the types hereinbefore described to one wagon and that they may be operated by any agencies hereinbefore described and illustrated, and with reference to the worm wheel and gear mechanisms they may be operated through vertical rods and suitable connecting-gears, which vertical rods themselves would be driven through a suitable agency extending along the tops of the wagons or by hand-power on each wagon.

Having now particularly described and ascertained the nature of my said invention and in what manner the same is to be performed, I declare that what I claim is—

1. The combination of two horizontal leaves adapted to together form the bottom of the wagon, each pivoted upon a more or less central axis, one or more transverse shafts carrying four differentially-handed screws, four respectively-formed traveling nuts, and links adapted to effect changeable and operative connections between said screws (through their nuts) and the respectively-desiderated leaves, as set forth with reference to the accompanying drawings.

2. The combination of two horizontal leaves adapted to together form the bottom of the wagon, each pivoted upon a more or less central axis, one or more transverse shafts carrying four differentially-handed screws, four respectively-formed traveling nuts, and links adapted to effect changeable and operative connections between said screws (through their nuts) and the respectively-desiderated leaves and wagon sides, the latter adapted by being pivoted along lines in their tops to be swung outward during the act of tipping by the pressure of the load against the retaining power of automatic operating devices, as set forth.

3. The combination, in a tip-wagon bottom, of four leaves, two principal and two subsidiary, the latter respectively pivoted along the adjacent edges of the former, and screw-nut and link devices by which the said leaves can be tipped right or left below the horizontal axes of the leaves, as set forth.

4. The combination, in respect of a tip-wagon bottom, of four leaves, two principal and two subsidiary, and bolting devices adapted to hold each subsidiary leaf in the same plane as its principal one or to release it therefrom, as set forth.

5. The combination, in respect of a tip-wagon bottom, of four leaves, two principal and two subsidiary, bolting devices adapted to hold each subsidiary leaf in the same plane as its principal one or to release it therefrom, and raising-plates adapted to be operated from the side of the wagon, as set forth.

6. The combination of transverse tipping-screws, traveling-nut and link gear, and rope-pulley with the link upon each tip-wagon of a train, and an endless driving-cord adapted to be driven from any source passing round all the pulleys of the train, as set forth.

7. The combination, in a tip-wagon, of sides adapted to swing outward when it is tipped against the pressure of the load, bottom consisting of four leaves, two principal and two subsidiary, centrally pivoted, pair of rams, and links connecting the respective edges of each link to the cross-head of the respective ram, as set forth.

8. The combination of hopper sides, two longitudinal leaves respectively hinged to the adjacent edges of the said sides and adapted to together form the bottom of the wagon, one or more transverse shafts, each carrying two differentially-handed screws, a traveling nut upon each screw, and a link connecting each nut to the respective leaf, as set forth.

9. The combination of four longitudinal leaves of equal width hinged together longitudinally in pairs upon fixed pivots and adapted to together form the bottom of the wagon, one or more transverse shafts, each carrying four differentially-handed screws, four internally-screwed nuts adapted to travel upon the said screws, respectively, and four links adapted to effect changeable and operative connections between the said screws through their nuts and the respectively-desiderated leaves, as set forth.

10. The combination of four longitudinal leaves of equal width hinged together longitudinally in pairs upon fixed pivots and adapted to together form the bottom of the wagon, one or more transverse shafts, each carrying four differentially-handed screws, four internally-screwed nuts adapted to travel upon the said screws, respectively, four links adapted to effect changeable and operative connections between the said screws (through their nuts) and the respectively-desiderated leaves, and a horizontal flap hinged to each side of the wagon and standing as to its free edge within the path of the adjacent leaf when the latter is tipped upward, as set forth.

11. The combination of four longitudinal leaves of equal width hinged together longitudinally in pairs upon fixed pivots and adapted to together form the bottom of the wagon, one or more transverse shafts, each carrying four differentially-handed screws, four internally-screwed nuts adapted to travel upon the said screws, respectively, four links adapted to effect changeable and operative connections between the said screws (through their nuts) and the respectively-desiderated leaves, a horizontal flap hinged to each side of the wagon and standing as to its free edge within the path of the adjacent leaf when the latter is tipped upward, and wagon sides hinged to fixed longitudinal top rails, as set forth.

12. The combination of a tip-wagon having sides adapted to swing outward when it is tipped against the pressure of the load with any of the tipping-gears hereinbefore described and illustrated, as set forth.

13. The combination of two leaves pivoted along a longitudinal axis common to them both and an automatic closing-plate adapted to close and to keep closed any gap between the said leaves, as set forth.

14. The combination of two leaves pivoted along a longitudinal axis common to them both and transverse pivoted beams, as set forth.

15. The combination of leaves pivoted along a longitudinal axis, a wagon side, and a flap hinged to the latter, as set forth.

16. The combination of leaves pivoted along a longitudinal axis, transverse beams pivoted at right angles to the said longitudinal axis, and pivoted wagon sides, as set forth.

17. The combination of leaves, subsidiary leaves, and rope-and-pulley gear for actuating the said subsidiary leaves, as set forth.

In testimony whereof I have hereunto affixed my signature in presence of two witnesses.

GEO. ANDERSON.

Witnesses:
 HENRY H. LEIGH,
  22 Southampton Bdgs., London.
 JOSEPH LAKE,
  17 Gracechurch Street, London, E. C.